United States Patent
Takahashi et al.

(10) Patent No.: US 9,902,135 B2
(45) Date of Patent: Feb. 27, 2018

(54) GALVANIZED STEEL SHEET FOR HOT FORMING

(71) Applicant: NIPPON STEEL & SUMITOMO METAL CORPORATION, Tokyo (JP)

(72) Inventors: Hiroyuki Takahashi, Tokyo (JP); Kazuhito Imai, Tokyo (JP); Hitomi Nishibata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/417,876

(22) PCT Filed: Aug. 5, 2013

(86) PCT No.: PCT/JP2013/071118
§ 371 (c)(1),
(2) Date: Jan. 28, 2015

(87) PCT Pub. No.: WO2014/024825
PCT Pub. Date: Feb. 13, 2014

(65) Prior Publication Data
US 2015/0314568 A1 Nov. 5, 2015

(30) Foreign Application Priority Data
Aug. 7, 2012 (JP) ................. 2012-175280

(51) Int. Cl.
| | | |
|---|---|---|
| B23B 15/00 | (2006.01) |
| B32B 15/01 | (2006.01) |
| C22C 38/54 | (2006.01) |
| C22C 38/50 | (2006.01) |
| C23C 2/06 | (2006.01) |
| C23C 2/28 | (2006.01) |
| C21D 9/46 | (2006.01) |
| C21D 1/18 | (2006.01) |
| C22C 18/00 | (2006.01) |
| C22C 38/58 | (2006.01) |
| C22C 18/04 | (2006.01) |
| C22C 38/00 | (2006.01) |
| C22C 38/02 | (2006.01) |

(Continued)

(52) U.S. Cl.
CPC ............. *B32B 15/013* (2013.01); *C21D 1/18* (2013.01); *C21D 1/673* (2013.01); *C21D 8/0205* (2013.01); *C21D 8/0247* (2013.01); *C21D 9/46* (2013.01); *C22C 18/00* (2013.01); *C22C 18/04* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/44* (2013.01); *C22C 38/50* (2013.01); *C22C 38/54* (2013.01); *C22C 38/58* (2013.01); *C23C 2/06* (2013.01); *C23C 2/28* (2013.01); *C23C 2/40* (2013.01); *C21D 2211/005* (2013.01); *Y10T 428/12799* (2015.01)

(58) Field of Classification Search
None
See application file for complete search history.

(56) References Cited

U.S. PATENT DOCUMENTS 6,200,672 B1 * 3/2001 Tadokoro ............... C09D 5/086
106/14.12
2001/0042393 A1 11/2001 Kefferstein et al.
(Continued)

FOREIGN PATENT DOCUMENTS

| CN | 102094149 A | 6/2011 |
| CN | 102414335 A | 4/2012 |

(Continued)

OTHER PUBLICATIONS

International Search Report, issued in PCT/JP2013/071118, dated Oct. 29, 2013.
(Continued)

*Primary Examiner* — Daniel J Schleis
(74) *Attorney, Agent, or Firm* — Birch, Stewart, Kolasch & Birch, LLP

(57) ABSTRACT

A galvanized steel sheet for hot forming, the galvanized steel sheet including a galvanized film provided on a surface of a steel sheet,
wherein the steel sheet has a chemical composition consisting of, in mass %,
C: 0.02% to 0.58%,
Mn: 0.5% to 3.0%,
sol. Al: 0.005% to 1.0%,
a predetermined element(s) as necessary;
Si: less than or equal to 2.0%,
P: less than or equal to 0.03%,
S: less than or equal to 0.004%,
N: less than or equal to 0.01%, and
the balance: Fe and impurities,
wherein a content of Mn in a portion from an interface of the steel sheet and the galvanized film to a depth of 5 μm is more than or equal to 0.3 mass %,
wherein the galvanized film has a plating coverage of 40 g/m² to 110 g/m², an Al content of more than or equal to 150 mg/m² within the galvanized film, and an Al concentration of less than or equal to 0.5 mass %, and
wherein the galvanized steel sheet is used for an application in which the galvanized steel sheet is heated to 700° C. or above and is then subjected to hot forming.

18 Claims, No Drawings

(51) Int. Cl.
   *C22C 38/04*  (2006.01)
   *C22C 38/06*  (2006.01)
   *C22C 38/22*  (2006.01)
   *C22C 38/24*  (2006.01)
   *C22C 38/26*  (2006.01)
   *C22C 38/28*  (2006.01)
   *C22C 38/32*  (2006.01)
   *C22C 38/38*  (2006.01)
   *C22C 38/42*  (2006.01)
   *C22C 38/44*  (2006.01)
   *C23C 2/40*  (2006.01)
   *C21D 8/02*  (2006.01)
   *C21D 1/673*  (2006.01)

(56) References Cited

U.S. PATENT DOCUMENTS

| | | |
|---|---|---|
| 2004/0202889 A1 | 10/2004 | Fujita et al. |
| 2012/0040203 A1 | 2/2012 | Takagi et al. |
| 2013/0167980 A1 | 7/2013 | Kawata et al. |

FOREIGN PATENT DOCUMENTS

| | | | |
|---|---|---|---|
| EP | 1160346 | A | 12/2001 |
| EP | 2474639 | A1 | 7/2012 |
| JP | 2001-353548 | A | 12/2001 |
| JP | 2002-97560 | A | 4/2002 |
| JP | 2003-73774 | A | 3/2003 |
| JP | 2005-48254 | A | 2/2005 |
| JP | 2007-211276 | A | 8/2007 |
| JP | 2010-65314 | A | 3/2010 |
| JP | 2011-26674 | A | 2/2011 |
| JP | 2011-256404 | A | 12/2011 |
| JP | 2011256404 | * | 12/2011 |
| JP | 2012-102359 | A | 5/2012 |
| JP | 2012102359 | * | 5/2012 |
| WO | WO 2012/036269 | A1 | 3/2012 |

OTHER PUBLICATIONS

Written Opinion of the International Searching Authority, issued in PCT/JP2013/071118, dated Oct. 29, 2013.

Chinese Office Action and Search Report for Chinese Application No. 201380041705.1, dated Dec. 4, 2015, with a partial English translation.

Extended European Search Report for European Application No. 13828035.9, dated Jan. 20, 2016.

Koren Office Action for Korean Application No. 10-2015-7003038, dated Dec. 21, 2015, with a partial English translation.

* cited by examiner

GALVANIZED STEEL SHEET FOR HOT FORMING

TECHNICAL FIELD

The present disclosure relates to a galvanized steel sheet for hot forming, particularly a galvanized steel sheet for hot forming that is suitable for use in the manufacture of automobile under-carriage members and reinforcing components. This application is based upon and claims the benefit of priority from the prior Japan Patent Application No. 2012-175280, filed on Aug. 7, 2012 with the Japanese Patent Office, the contents of which are incorporated herein by reference.

BACKGROUND ART

In recent years, for weight reduction of automobiles, an effort has been made to reduce the thickness of steel sheets to be used, through an increase in strength of the steel sheets. As a technique for subjecting difficult-to-form material such as a high strength steel sheet to press forming, a hot forming technique such as a hot press has become more and more adopted in which a material that is to be subjected to forming is preheated before forming.

The hot forming method is advantageous in that forming is carried out at an elevated temperature that renders deformation resistance low and hardening can be carried out simultaneously with the forming. Accordingly, the hot forming method is an excellent forming method that can simultaneously ensure strengthening of the member and the formability. The hot forming method, however, requires heating of a steel sheet to a high temperature of 700° C. or above before forming and thus poses a problem of oxidation of the steel sheet surface. Scale formed of iron oxide produced as a result of the oxidation of the steel sheet surface disadvantageously comes off during pressing, is adhered to a mold, and results in lowered productivity, or the scale stays in products after pressing and leads to poor appearance. Further, when such scale stays, the adhesion between the steel sheet and the coating film is so low that the corrosion resistance is lowered in coating in the next step. Accordingly, after pressing, descaling such as shot blasting is necessary.

In order to solve the above problems, the use of galvanized steel sheets coated with a zinc-based plating or an aluminum-based plating has been proposed as a material for hot forming with a view to inhibiting the oxidation of the base-material steel surface and/or improving the corrosion resistance of press formed products. For example, Patent Literatures 1 and 2 use galvanized steel sheets in hot forming.

Further, Patent Literature 3 proposes a steel sheet that can simplify or eliminate the step of separating the oxide of the formed product surface through an improved adhesion of an oxide film formed in hot forming by specifying the concentration of C, Si, P, and/or Ti in steel and specifying the coverage of Zn on a steel sheet surface and the concentration of Al in a film.

PRIOR ART LITERATURES

Patent Literatures

[Patent Literature 1] JP 2003-73774A
[Patent Literature 2] JP 2001-353548A
[Patent Literature 3] JP 2005-48254A

SUMMARY OF THE INVENTION

Problems to be Solved by the Invention

In galvanized steel sheets for hot forming manufactured by conventional techniques, however, it has been found that, when the amount of a zinc oxide layer formed in the hot forming is excessively large, deposition or spark sometimes occurs in spot welding after the hot forming.

As well known, panels for automobile bodies are assembled by joining the panels pressed into various shapes to each other by resistance welding (particularly spot welding). In particular, when spot welding is carried out, since welding is continuously carried out at a number of spots, the number of times of continuous dotting by an identical electrode tip should be maximized for productivity improvement purposes.

In order to increase the number of times of continuous dotting in the spot welding, the suppression of wear of the electrode tip is important. When the deposition of the electrode tip or the spark occurs during the welding, the wear of the electrode is accelerated and the electrode tip comes off. As a result, subsequent welding cannot be continued. For this reason, the suppression of the occurrence of deposition or spark during the spot welding is important from the viewpoint of improving the productivity.

An object of the present disclosure is to solve the problem of spot weldability after the hot forming of the galvanized steel sheet for hot forming.

Means for Solving the Problems

The inventors of the present disclosure have made investigations on the formation of zinc oxide in hot forming of a galvanized steel sheet for hot forming and have made extensive and intensive studies on an improvement in spot weldability after hot forming. As a result, the inventors of the present disclosure have found that, when large amounts of Al oxide and Mn oxide are produced in a plating film in the hot forming by bringing the chemical composition of a steel sheet as a substrate to be plated, the coverage of plating and the amount and concentration of Al in a galvanized layer to respective proper ranges, lowering the amount of Mn near the surface layer of the steel sheet and optimizing the metallographic structure, excessive formation of the zinc oxide layer can be suppressed, and it becomes possible to improve spot weldability after the hot forming.

The present disclosure based on such finding is as follows.

A galvanized steel sheet for hot forming, the galvanized steel sheet including a galvanized film provided on a surface of a steel sheet,
wherein the steel sheet has a chemical composition consisting of, in mass %,
C: 0.02% to 0.58%,
Mn: 0.5% to 3.0%,
sol. Al: 0.005% to 1.0%,
Ti: 0% to 0.20%,
Nb: 0% to 0.20%,
V: 0% to 1.0%,
W: 0% to 1.0%,
Cr: 0% to 1.0%,
Mo: 0% to 1.0%,
Cu: 0% to 1.0%,
Ni: 0% to 1.0%,
B: 0% to 0.010%, Mg: 0% to 0.05%,
Ca: 0% to 0.05%,
REM: 0% to 0.05%,
Bi: 0% to 0.05%,
Si: less than or equal to 2.0%,
P: less than or equal to 0.03%,
S: less than or equal to 0.004%,
N: less than or equal to 0.01%, and
the balance: Fe and impurities,
wherein a content of Mn in a portion from an interface of the steel sheet and the galvanized film to a depth of 5 µm is more than or equal to 0.3 mass %,
wherein the galvanized film has a plating coverage of 40 g/m$^2$ to 110 g/m$^2$, an Al content of more than or equal to 150 mg/m$^2$ within the galvanized film, and an Al concentration of less than or equal to 0.5 mass %, and
wherein the galvanized steel sheet is used for an application in which the galvanized steel sheet is heated to 700° C. or above and is then subjected to hot forming.

The galvanized steel sheet for hot forming according to [1], wherein the steel sheet includes one or more selected from the group consisting of, in mass %,
Ti: 0.01% to 0.20%,
Nb: 0.01% to 0.20%,
V: 0.1% to 1.0%, and
W: 0.1% to 1.0%.

The galvanized steel sheet for hot forming according to [1] or [2], wherein the steel sheet includes one or more selected from the group consisting of, in mass %,
Cr: 0.1% to 1.0%,
Mo: 0.1% to 1.0%,
Cu: 0.1% to 1.0%,
Ni: 0.1% to 1.0%, and
B: 0.0010% to 0.010%.

The galvanized steel sheet for hot forming according to any one of [1] to [3], wherein the steel sheet includes one or more selected from the group consisting of, in mass %,
Mg: 0.0005% to 0.05%,
Ca: 0.0005% to 0.05%, and
REM: 0.0005% to 0.05%.

The galvanized steel sheet for hot forming according to any one of [1] to [4], wherein the steel sheet includes, in mass %,
Bi: 0.0002% to less than or equal to 0.05%.

The galvanized steel sheet for hot forming according to any one of [1] to [5], wherein the galvanized steel sheet is an alloyed hot dip galvanized steel sheet.

In the present disclosure, "galvanization" as used herein means both zinc plating and zinc alloy plating.

Effects of the Invention

In the galvanized steel sheet for hot forming according to the present disclosure, excessive formation of zinc oxide in hot forming is suppressed, and, thus, the occurrence of deposition and spark in spot welding after the hot forming can be suppressed. As a result, in an automobile body assembling process, the number of times of continuous dotting in welding can be improved, and, thus, the necessary frequency of repair of the electrode tip can be reduced. Further, the frequency of the occurrence of a spark phenomenon can be reduced, and the necessity of repair of the surface of automobile bodies can be eliminated. Thus, troubles involved in welding can be avoided, advantageously leading to dramatically improved productivity of an automobile body assembling process.

MODES FOR CARRYING OUT THE INVENTION

The chemical composition of a base steel sheet as a substrate, a plating film, a hot forming method, and a manufacturing method for the galvanized steel sheet for hot forming according to the present disclosure will be described in more detail. In the present specification, in all cases, "%" in chemical composition represents "mass %."

1. Chemical Composition of Steel Sheet as Substrate
[Indispensable Ingredients]
[C: 0.02% to 0.58%]

C is a very important element that enhances the hardenability of the steel sheet and mainly determines strength after hardening. Further, C is an element that lowers an $AC_3$ point and promotes a lowering in a hardening treatment temperature. When the content of C is less than 0.02%, the contemplated effect is not satisfactory. Therefore, the C content is more than or equal to 0.02%. On the other hand, when the C content is more than 0.58%, the toughness of a hardened portion is significantly deteriorated. Thus, the C content is less than or equal to 0.58%. The C content is preferably less than or equal to 0.45%.

[Mn: 0.5% to 3.0%]

Mn is an element that is very effective in enhancing the hardenability of the steel sheet and stably ensuring the strength after hardening. Further, Mn is diffused in a plating film in heating before hot forming to form a large amount of a Mn oxide in the plating film. Accordingly, excessive formation of a zinc oxide layer can be suppressed and the spot weldability after hot forming can be improved. When the content of Mn is less than 0.5%, the contemplated effect is not satisfactory. Therefore, the Mn content is more than or equal to 0.5%. The Mn content is preferably more than or equal to 0.8%. On the other hand, when the Mn content is more than 3.0%, the effect is saturated. Further, in this case, difficulties are sometimes encountered in ensuring stable strength after hardening. Thus, the Mn content is less than or equal to 3.0%. The Mn content is preferably less than or equal to 2.4%.

[Sol. Al: 0.005% to 1.0%]

Al functions to deoxidize steel and thus to render a steel product sound. When the content of sol. Al is less than 0.005%, the functional effect cannot be attained without difficulties. Therefore, the sol. Al content is more than or equal to 0.005%. On the other hand, when the sol. Al content is more than 1.0%, the functional effect is saturated and is not cost-effective. Thus, the sol. Al content is less than or equal to 1.0%.

[Optional Ingredients]

In the present disclosure, the steel sheet as a substrate may contain, in addition to the indispensable ingredients, the following optional ingredients in respective predetermined content ranges. Unlike the indispensable ingredients, the following optional ingredients may not be contained.

[One or More Selected from the Group Consisting of Ti: 0% to 0.20%, Nb: 0% to 0.20%, V: 0% to 1.0%, and W: 0% to 1.0%]

Ti, Nb, V, and W are elements that promote mutual diffusion of Fe and Zn in the galvanized layer and the base steel sheet, enhance an alloying rate of the galvanized layer, and suppress the formation of a molten Zn alloy layer, for example, in hot forming. Accordingly, Ti, Nb, V, and W may be contained in the steel sheet as the substrate. When the content of Ti or the content of Nb is more than 0.20%, or when the content of V or the content of W is more than 1.0%, the functional effect is saturated and, thus, this is not cost-effective. Therefore, the content of Ti and the content of Nb are each less than or equal to 0.20%, and the content of V and the content of W are each less than or equal to 1.0%. The content of Ti and the content of Nb are each preferably less than or equal to 0.15%, and the content of V and the content of W are each preferably less than or equal to 0.5%. In order to more reliably attain the functional effect, preferably, the content of Ti and the content of Nb are each more than or equal to 0.01%, and the content of V and the content of W are each more than or equal to 0.1%

[One or More Selected from the Group Consisting of Cr: 0% to 1.0%, Mo: 0% to 1.0%, Cu: 0% to 1.0%, Ni: 0% to 1.0%, and B: 0% to 0.010%]

Cr, Mo, Cu, Ni, and B are elements that are effective in enhancing the hardenability of the steel sheet and stably ensuring strength after hardening. Therefore, one or more of these elements may be contained. When the content of Cr, the content of Mo, the content of Cu, or the content of Ni is more than 1.0% or when the content of B is more than 0.010%, the contemplated effect is saturated and, thus, this is not cost-effective. Thus, the content of Cr, the content of Mo, the content of Cu, and the content of Ni are each less than or equal to 1.0%, and the content of B is less than or equal to 0.010%. The content of B is preferably less than or equal to 0.0080%. In order to more reliably attain the contemplated effect, preferably, any one of Cr: more than or equal to 0.1%, Mo: more than or equal to 0.1%, Cu: more than or equal to 0.1%, and Ni: more than or equal to 0.1%, and B: more than or equal to 0.0010% is satisfied.

[One or More Selected from the Group Consisting of Ca: 0% to 0.05%, Mg: 0% to 0.05%, and REM: 0% to 0.05%]

Ca, Mg, and REM function to refine the form of inclusions in the steel and thus to prevent the occurrence of inclusion-derived cracking in hot forming. Therefore, one or more of these elements may be contained. When these elements are added in an excessive amount, the effect of refining the form of inclusions in the steel is saturated, disadvantageously leading to an increased cost. Thus, the Ca content, the Mg content, and the REM content are less than or equal to 0.05%, less than or equal to 0.05%, and less than or equal to 0.05%, respectively. In order to more reliably attain the functional effect, preferably, any one of Ca: more than or equal to 0.0005%, Mg: more than or equal to 0.0005%, and REM: more than or equal to 0.0005% is satisfied.

Here REM refers to 17 elements in total of Sc, Y, and lanthanoids, and the content of REM refers to the total content of these elements. Lanthanoids are industrially added as misch metal.

[Bi: 0% to 0.05%]

Bi is an element that becomes a solidification nucleus in a solidification process of a molten steel and reduces a secondary arm spacing of dendrite, thereby suppressing the segregation of Mn and the like that segregate within the secondary arm spacing of the dendrite. Therefore, Bi may be contained. In particular, for steel sheets in which a large amount of Mn is contained, such as steel sheets for hot pressing, Bi is effective in suppressing a deterioration in toughness derived from the segregation of Mn. Accordingly, preferably, Bi is contained in such steel grade. When Bi is contained in an amount of more than 0.05%, the functional effect is saturated, disadvantageously leading to an increased cost. Thus, the Bi content is less than or equal to 0.05%. The Bi content is preferably less than or equal to 0.02%. In order to more reliably attain the functional effect, the Bi content is preferably more than or equal to 0.0002%. The Bi content is more preferably more than or equal to 0.0005%.

[Impurities]

Fe and impurities may be mentioned as the balance other than the above-described elements. Examples of impurities include those contained in raw materials such as ores or scraps and those included the manufacturing process. In the present disclosure, the following impurities are exemplified as typical impurities.

[Si: Less than or Equal to 2.0%]

Si is an element that is contained as an impurity, suppresses mutual diffusion of Fe and Zn in the galvanized layer and the base steel sheet, and lowers the alloying rate of the galvanized layer. Further, in heating before hot forming, Si is enriched in the interface of a zinc oxide layer formed by the heating and the steel sheet and lowers the adhesion of the zinc oxide layer. The Si content is less than or equal to 2.0% from the viewpoint of ensuring the adhesion of the zinc oxide layer high enough to withstand a difference in thermal expansion caused in hot forming or rapid cooling. The Si content is more preferably less than or equal to 1.5%.

[P: Less than or Equal to 0.02%]

P is an element that is contained as an impurity, suppresses mutual diffusion of Fe and Zn in the galvanized layer and the base steel sheet, and lowers the alloying rate of the galvanized layer. In order to avoid an excessive increase in the zinc oxide layer in heating before hot forming, a method is useful in which Zn that is an original plating ingredient is incorporated as an Fe—Zn solid solution phase in the surface layer of the steel sheet to suppress oxidation. When the P content is more than 0.02%, the suppression of oxidation is difficult. Accordingly, the P content is less than or equal to 0.02%. The P content is preferably less than or equal to 0.01%.

[S: Less than or Equal to 0.004%]

S is an element that is contained as an impurity, forms MnS, and functions to render the steel brittle. The incorporation of S in a large amount inhibits the diffusion of Mn in a galvanized film in heating before hot forming, reduces the amount of Mn oxide in the galvanized film, and deteriorates the spot weldability. Accordingly, the S content is less than or equal to 0.004%. The S content is more preferably less than or equal to 0.003%.

[N: Less than or Equal to 0.01%]

N is an element that is contained as an impurity, forms an inclusion in the steel, and deteriorates the toughness after hot forming. Thus, the N content is less than or equal to 0.01%, preferably less than or equal to 0.008%, and more preferably less than or equal to 0.005%.

2. Galvanized Film

[Coverage of Galvanizing]

The steel sheet for hot forming according to the present disclosure is a galvanized steel sheet including a galvanized layer provided on a surface of a steel sheet. The coverage of galvanizing is 40 g/m$^2$ to 110 g/m$^2$ per one surface (the same shall apply hereinafter). When the coverage of the galvanizing is excessively large (more than 110 g/m$^2$), Zn in the galvanized film cannot be satisfactorily incorporated in the base-material steel sheet as solid solution phase during heating before hot forming and the zinc oxide layer is disadvantageously excessively formed, resulting in lowered adhesion. The coverage of the galvanizing is excessively small (less than 40 g/m$^2$), difficulties are encountered in forming the zinc oxide layer in an amount large enough to suppress the oxidation of the steel sheet in heating before hot forming.

[Composition of Galvanizing]

The composition of the galvanized film is not particularly limited, and the film may be a pure zinc plated film or alternatively may be a zinc alloy plated film in which one or more alloying elements selected, for example, from Al, Mn, Ni, Cr, Co, Mg, Sn, and Pb have been incorporated in a proper amount according to contemplated purposes (for Al, the concentration of Al is limited to less than or equal to 0.5 mass %, as described below). In some cases, one or more selected, for example, from Fe, Be, B, Si, P, S, Ti, V, W, Mo, Sb, Cd, Nb, Cu, and Sr that are sometimes unavoidably included, for example, from raw materials are contained in the plated film. Further, the film may be a Zn—Fe alloy plated film formed by heat treating a galvanized film or an alloyed hot dip galvanized film, that is, a hot dip galvanized film. More specifically, in addition to hot dip galvanizing and a Zn—Fe alloy plating, galvanizing containing zinc, for example, hot dip 5% Al—Zn plating and hot-dip 10% Ni—Zn plating, can exert the effect of the present disclosure.

The method for glavannealing is also not particularly limited. However, hot dip galvanizing is advantageous from the viewpoint of providing a galvanizing coverage of more than or equal to 40 g/m². The galvanized film is preferably a hot dip galvanized film and an alloyed hot dip galvanized film.

The concentration of Fe in the galvanized film in the alloyed hot dip galvanized steel sheet is preferably in the range of 8 to 15%. When the concentration of Fe is below the lower limit of a defined range, a pure zinc phase having a low melting point is likely to stay on the surface, and a thick oxide film composed mainly of zinc is also likely to be formed. On the other hand, when the concentration of Fe in the galvanized film is above the upper limit of the defined range, a powdering phenomenon in which the galvanized layer is separated is disadvantageously likely to occur.

[Amount and Concentration of Al in Galvanized Film]

The amount of Al in the galvanized film is more than or equal to 150 mg/m². When the amount of Al in the film is less than 150 mg/m², the amount of Al oxide produced in the film surface layer in heating before hot forming is so small that the oxidation of zinc is not inhibited and zinc oxide is produced in an excessive amount, disadvantageously leading to occurrence of spark or deposition in spot welding. From the viewpoint of promoting the diffusion of zinc in the base-material steel in hot forming, the concentration of Al in the galvanized film is less than or equal to 0.5 mass %, preferably less than or equal to 0.4 mass %.

The amount of Al in the film of the hot dip galvanized steel sheet produced in a continuous hot dip galvanizing line is influenced, for example, by an atmosphere, a bath temperature, an intrusion material temperature, a dipping time, and a concentration of Al in bath in heating before annealing. The amount of Al in the film can be brought to more than or equal to 150 mg/m² by experimentally determining the relationship between these production conditions and the amount of Al in the film. In order to bring the amount of Al in the film to more than or equal to 150 mg/m², the concentration of Al in the bath is preferably in the range of about 0.12 to 0.18 mass %, and more preferably in the range of 0.14 to 0.16 mass %.

Among hot dip galvanized steel sheets, alloyed hot dip galvanized steel sheets are particularly preferred for hot forming applications, because the separation of the galvanized film after hot forming is significantly small. In the alloyed hot dip galvanized steel sheet, the melting point of the galvanizing is high, and an Fe—Al-based alloy layer is absent in the interface of the base-material steel and the galvanized film. Accordingly, the alloyed hot dip galvanized steel sheet is advantageous in that zinc is diffused in the base-material steel in heating before hot forming to form a solid solution phase. In pure zinc galvanizing, for example, in hot dip galvanized steel sheets, the melting point of the galvanizing is low and about 420° C. Accordingly, zinc is likely to be evaporated, and the Fe—Al layer present at the interface inhibits the diffusion of Zn. Thus, a thick oxide film composed mainly of zinc is likely to be formed.

[Concentration of Mn in Surface Layer in Steel Sheet]

The content of Mn in the steel sheet in a portion from the interface of the steel sheet and the galvanized film to a depth of 5 μm is preferably more than or equal to 0.3 mass %. When the concentration of Mn in the surface layer of the steel sheet is more than or equal to a given value, Mn can easily be diffused in the galvanized film in heating before hot forming. When a large amount of Mn is present in the galvanized film, Mn oxide can be easily formed to suppress the oxidation of zinc. In order to attain this effect, the content of Mn in the steel sheet in a portion from the interface of the steel sheet and the galvanized film to a depth of 5 μm is more than or equal to 0.3 mass %. The reason for this is that Mn in the steel sheet at a depth of more than 5 μm has little effect due to a large distance of diffusion from the galvanized film, while, when the amount of Mn in a portion from the interface of the steel sheet and the galvanized film to a depth of 5 μm is less than 0.3 mass %, the contemplated effect cannot be attained.

[Metallographic Structure of Steel Sheet]

Further, in order to easily diffuse Mn in the galvanized film during heating before hot forming for spot weldability improvement purposes, the metallographic structure of the steel sheets in a portion from the interface of the steel sheet and the galvanized film to the depth of 5 μm has a ferrite area percentage of more than or equal to 60%. When the ferrite area percentage is more than or equal to 60%, Mn can easily be diffused in the galvanized film during heating before hot forming. On the other hand, when the content of C-containing pearlite, bainite, or martensite is more than or equal to 40%, the diffusion of Mn is delayed by C.

3. Hot Forming

The galvanized steel sheet according to the present disclosure is usually heated to a temperature of about 700 to 1000° C., and, subsequently, hot forming such as press forming is carried out.

Examples of heating methods include heating, for example, by electric furnaces and gas furnaces, and flame heating, electric heating, high-frequency heating, induction heating and other heating. When achieving hardening of the material by heating is also contemplated, a method is adopted that includes, after heating of a material to a hardening temperature (usually about 700 to 1000° C.) that provides a target hardness, keeping the temperature for a given period of time, subjecting the material to pressing in the high-temperature state with a mold through which, for example, a cooling pipe is passed, and, in this case, rapidly cooling the material through contact with the mold. A method may be of course adopted in which properties of products after hot pressing are regulated by varying the hardening temperature or the cooling rate in a preheated pressing mold.

4. Manufacturing Method

As described above, in the hot forming of the steel sheet, the steel sheet is heated in hot forming to a temperature of or near an austenite region, and forming is carried out in the temperature region. Therefore, mechanical properties of the base steel sheet at room temperature before heating are not important. Thus, the metallographic structure of the base steel sheet before heating is not particular limited. That is, the base steel sheet before galvanizing may be any one of a hot-rolled steel sheet and a cold-rolled steel sheet and may be manufactured by any method without particular limitation. However, manufacturing methods suitable from the viewpoint of productivity will be described.

[Hot Rolling]

Hot rolling is preferably finish rolling at a sheet temperature of 960° C. or below so that the amount of Mn in the surface layer is not reduced by oxidation. Coiling is carried out within two seconds after the finish rolling at a cooling rate of 20° C./sec or above and at a sheet temperature of 650° C. or below. The reason for this is that, the concentration of Mn on the surface of the steel sheet is, when the steel sheet is exposed to an oxidizing atmosphere, since Mn is more easily oxidized than iron, the steel sheet surface is selectively oxidized and the concentration of Mn near the surface is lowered. Accordingly, after hot rolling, the steel sheet has to be rapidly cooled. On the other hand, when the coiling temperature is CT 500° C. or below, the ferrite transformation is less likely to occur, and, thus, a ferrite area percentage of more than or equal to 60% in the metallographic structure in a portion from the interface of the steel sheet and the galvanized film to a depth of 10 μm cannot be ensured. Thus, the coiling temperature is preferably 500 to 650° C. Further, after the coiling, cooling is preferably carried out at a sheet temperature of from 650° C. to 400° C. at a rate of less than or equal to 20° C./hr. In this treatment, in a sheet temperature range of 650° C. or below, the diffusion rate of Mn within the steel sheet is suppressed, and, thus, the oxidation of Mn proceeds on the surface of the steel sheet, leading to a lowered Mn concentration at a portion very close to the steel sheet, but on the other hand, this treatment has the effect of recovering the total amount of Mn within 5 μm from the surface layer that effectively functions in hot forming. Further, in order to attain a more significant effect after the coiling, heat treatment is preferably carried out at a sheet temperature between 650° C. and 450° C. for 10 hr or longer. In particular, soaking treatment is preferably carried out at a sheet temperature between 650° C. and 500° C. for 10 hr or longer. This can enhance the effect of recovering the total amount of Mn within 5 μm from the surface layer that effectively functions in hot forming.

[Cold Rolling]

Cold rolling is carried out by an ordinary method. In the steel sheet according to the present disclosure, the amount of carbon is so large that cold rolling at an excessively high rolling reduction leads to an increased burden on a mill. An excessively enhanced strength after cold rolling by work hardening poses a problem of weld strength in coil connection or a line passing property in a galvanizing line. Thus, the rolling reduction is preferably less than or equal to 90%, more preferably less than or equal to 80%.

[Galvanizing]

In the formation of the galvanized layer, the use of a continuous hot dip galvanizing line having an excellent production efficiency is preferred. When the substrate is a hot-rolled steel sheet, coil is rewound followed by galvanizing. On the other hand, when the substrate is a cold-rolled steel sheet, annealing is generally followed by hot dip galvanizing.

A galvanizing method will be described by taking as an example hot dip galvanizing or alloyed hot dip galvanizing in a continuous hot dip galvanizing line.

In continuous galvanizing, at the outset, a steel product is heated in a heating furnace for annealing. The highest heating temperature of the steel product in the heating furnace is preferably a temperature of (Ac3 point −50° C.) or below. When the highest heating temperature is a temperature above (Ac3 point −50° C.), the austenitization of a metallographic structure of the steel sheet produced in hot rolling in a portion from the surface of the steel sheet to a depth of 5 μm proceeds and the ferrite area percentage in the metallographic structure in a portion from the interface of the steel sheet and the galvanized film to a depth of 5 μm cannot be brought to more than or equal to 60%. On the other hand, since the lower limit of the highest heating temperature hardly affects the ferrite area percentage in the metallographic structure of the steel sheet produced in hot rolling in a portion from the surface of the steel sheet to a depth of 5 μm and is thus maintained in a continuously annealed sheet, the lower limit of the highest heating temperature is not particularly specified.

In the annealing atmosphere in the continuous hot dip galvanizing line, the dew point is −30° C. or below. When the dew point is above −30° C., a portion near the surface layer of the steel sheet is likely to be oxidized before hot dip galvanizing and the amount of Mn in the surface layer is disadvantageously reduced by the oxidation of the steel sheet surface. Preferably, the dew point is −35° C. or below because a better effect can be attained. When the dew point of the annealing atmosphere is −30° C. or below, selective oxidation of Mn of the steel sheet surface limits the supply of oxygen component (for example, oxygen or moisture) to the surface and, thus, oxidation is suppressed, contributing to an increase in total amount of Mn within 5 μm from the surface layer before hot working.

The cooling rate after heating does not affect the ferrite area percentage in a portion from the steel sheet surface to a depth of 5 μm, and, thus, cooling can be carried out at any rate. Preferably, the steel sheet is cooled at a cooling rate of less than or equal to 70° C./sec from the viewpoint of softening the steel sheet.

The hot dip galvanizing may be carried out by dipping the steel sheet in a hot dip galvanizing bath and pulling up the steel sheet according to an ordinary method. The coverage of the galvanizing is regulated by a pulling-up rate and by regulating the flow rate of a wiping gas blown out through a nozzle. The concentration of Al in the galvanized film can be regulated by regulating the composition of the galvanizing bath, the temperature of the galvanizing bath, and the time of dipping in the galvanizing bath. The content of Al in the galvanized film can also be achieved by regulating the coverage of the galvanizing.

Alloying treatment is carried out by, after hot dip galvanizing treatment, reheating the material, for example, in a gas furnace or an induction heating furnace. Metal diffusion is carried out between the galvanizing layer and the base steel sheet, and alloying (Zn—Fe alloy formation) of the galvanized film proceeds. In order to enhance the content (%) of Fe in the galvanized layer, the alloying temperature is preferably brought to 480° C. or above. When the temperature is below 480° C., the alloying rate is so low that the line speed is lowered, and productivity is lowered, or it is necessary to take a measure in equipment such as an increase in length of the alloying furnace. The higher the alloying temperature, the higher the alloying rate. At an $Ac_1$ point or above, the steel sheet disadvantageously increases in strength for the same reason as the highest heating temperature. The alloying temperature is preferably in the range of 500 to 650° C.

When temper rolling is carried out after hot dip galvanizing or alloying treatment, flatness correction and surface roughness of the steel sheet can be regulated. Accordingly, temper rolling may be carried out in some applications.

In the galvanized steel sheet, as well known in the art, a chemical conversion film may be formed on the surface of the galvanized film from the viewpoint of enhancing the corrosion resistance or the coatability. The chemical conversion treatment is preferably carried out with a non-chromium-based chemical conversion treatment solution.

EXAMPLES

Slabs of steel grades A to J having chemical compositions specified in Table 1 were hot-rolled. Finish rolling was carried out at a sheet temperature of 900° C. from the viewpoint of avoiding a reduction in the amount of Mn in the surface layer. After One second from finish rolling, the steel sheets were cooled at a rate of 50° C./sec and coiled at a sheet temperature of 600° C. Thereafter, in order to recover the total amount of Mn in a portion of less than or equal to 5 μm from the surface layer that effectively functions in hot forming, the steel sheet was placed in a holding furnace and was gradually cooled from 600° C. to 400° C. at a rate of 5° C./hr to obtain a hot-rolled steel sheet having a thickness of 2.8 mm. The hot-rolled steel sheet was pickled and was then cold-rolled at a rolling reduction of 60% to prepare a 1.2 mm-thick cold-rolled steel sheet. Some hot-rolled steel sheets were not cold-rolled after the pickling.

The hot-rolled steel sheets and the cold-rolled steel sheets were galvanized in a hot dip galvanizing equipment. Annealing was carried out under conditions of 750° C.×200 seconds at a dew point of −40° C., followed by cooling to 540° C. at 6° C./sec. Plating was carried out under varied conditions of bath temperature: 450 to 460° C., Al concentration in bath: 0.10 to 0.15%, and coverage of galvanizing per one surface: 40 to 80 g/m². After hot dip galvanizing, alloying was carried out at a sheet temperature of 500 to 600° C. to prepare alloyed hot dip galvanized steel sheets. Some hot dip galvanized steel sheets were not subjected to the alloying treatment.

The amount of Mn in a portion from the interface of the steel sheet and the galvanized film to a depth of 5 μm was measured by glow discharge spectroscopy (GDS). For three places for each of the steel sheets, the profile of the amount of Mn in a portion from the interface of the galvanized steel sheet to a depth of 50 μm was examined by GDS. The amount of Mn within 5 μm from the surface was expressed in terms of an average value of the amount of Mn in a portion from the interface of the galvanized steel sheet to a depth of 5 μm. Further, the measurement values of the amount of Mn in a portion from the interface of the galvanized steel sheet to a depth of 50 μm for three measurement places were averaged.

The ferrite area percentage was determined as follows. The steel sheet was taken off and was subjected to nital etching. A portion near the surface layer was observed for each ten visual fields at a magnification of 500 times with an optical microscope, and the ferrite area percentage was calculated.

Specimens for hot pressing (specimen size: 250 mm in width×200 mm in length) were extracted from the manufactured hot dip galvanized steel sheets and alloyed hot dip galvanized steel sheets. The temperature of the steel sheet specimen within the heating furnace was allowed to reach 900° C. The steel sheet specimen was held at the temperature for 3 minutes and was then taken out, and, immediately after that, hot pressing was carried out with a sheet steel mold, followed by rapid cooling.

In such a state that two hot pressed steel sheet specimens were superimposed on top of each other, spot welding was carried out under the following conditions, followed by a 1000-point continuous dotting test for the evaluation of weldability. The number of times of spark was counted, and the specimen that caused deposition in the 1000-point continuous dotting test was described as "deposited."

Applied pressure: 400 kgf

Weld time: 15 cycles

Holding time: 9 cycles

Welding current: Current immediately before dust

Shape of electrode tip: DR type, end of tip is 6 mmφ-40R

The results of the spot weldability test, together with manufacturing conditions (cold rolling and alloying treatment done or not done) and the results of analysis of the galvanized film, are summarized in Table 2.

TABLE 1

| | Chemical composition (unit: mass %, balance: Fe and impurities) | | | | | | | | | |
| --- | --- | --- | --- | --- | --- | --- | --- | --- | --- | --- |
| Steel grade | C | Si | Mn | P | S | N | Al | Cr | Ti | B | Others |
| A | 0.22 | 1.50 | 1.6 | 0.01 | 0.002 | 0.004 | 0.03 | — | — | — | |
| B | 0.22 | 0.06 | 1.5 | 0.01 | 0.002 | 0.004 | 0.04 | — | — | — | Mg: 0.001 Ca: 0.002 |
| C | 0.21 | 0.04 | 1.2 | 0.01 | 0.001 | 0.004 | 0.04 | 0.2 | 0.02 | 0.0016 | |
| D | 0.20 | 0.30 | 1.3 | 0.02 | 0.002 | 0.004 | 0.03 | 0.2 | 0.02 | 0.0014 | Bi: 0.002 |
| E | 0.21 | 0.21 | 1.2 | 0.01 | 0.002 | 0.003 | 0.04 | 0.5 | 0.02 | 0.0015 | |
| F | 0.21 | 0.07 | 2.1 | 0.01 | 0.001 | 0.004 | 0.04 | 0.2 | 0.03 | 0.0020 | |
| G | 0.21 | 0.07 | 2.1 | 0.01 | 0.001 | 0.004 | 0.80 | 0.2 | 0.03 | 0.0020 | REM: 0.001 |
| H | 0.13 | 0.07 | 2.0 | 0.01 | 0.001 | 0.005 | 0.04 | 0.2 | 0.03 | 0.0023 | |
| I | 0.10 | 0.06 | 2.3 | 0.02 | 0.001 | 0.004 | 0.04 | 0.2 | 0.02 | 0.0022 | Cu0.2, Ni0.2, Mo0.2 |
| J | 0.30 | 0.20 | 1.7 | 0.01 | 0.001 | 0.003 | 0.04 | 0.2 | 0.03 | 0.0013 | Nb0.08, V0.2, W0.1 |

TABLE 2

| Classification | Test No. | Steel grade | Cold rolling done or not done | Alloying treatment done or not done | Content of Mn in portion from interface of steel sheet and galvanized film to depth of 5 μm (mass %) | Ferrite area percentage in portion from interface of steel sheet and galvanized film to depth of 5 μm (%) | Results of analysis of galvanized film of steel sheet before hot pressing | | | | Number of times of occurrence of spark in spot welding after hot forming(times) |
|---|---|---|---|---|---|---|---|---|---|---|---|
| | | | | | | | Coverage (g/m²) | Al amount (mg/m²) | Al concentration (%) | Fe concentration (%) | |
| Example of present disclosure | 1 | A | Done | Done | 1.0 | 64 | 43 | 154 | 0.37 | 11.5 | 0 |
| | 2 | B | Done | Done | 0.8 | 60 | 64 | 170 | 0.27 | 13.6 | 0 |
| | 3 | C | Done | Done | 0.3 | 81 | 61 | 152 | 0.26 | 11.2 | 0 |
| | 4 | C | Done | Done | 0.7 | 62 | 54 | 194 | 0.36 | 11.4 | 0 |
| | 5 | C | Not done | Done | 0.8 | 80 | 55 | 186 | 0.34 | 10.7 | 0 |
| | 6 | D | Done | Done | 0.3 | 54 | 78 | 152 | 0.24 | 10.0 | 3 |
| | 7 | E | Done | Done | 0.7 | 58 | 60 | 166 | 0.28 | 12.7 | 5 |
| | 8 | E | Done | Not done | 0.6 | 65 | 63 | 174 | 0.28 | <0.5 | 0 |
| | 9 | E | Done | Done | 0.3 | 62 | 65 | 152 | 0.30 | 10.5 | 0 |
| | 10 | F | Done | Done | 1.1 | 58 | 60 | 162 | 0.27 | 12.5 | 2 |
| | 11 | F | Done | Done | 0.3 | 67 | 62 | 151 | 0.26 | 11.5 | 0 |
| | 12 | G | Done | Done | 1.0 | 65 | 48 | 156 | 0.33 | 12.4 | 0 |
| | 13 | H | Done | Done | 1.3 | 54 | 60 | 192 | 0.32 | 13.4 | 1 |
| | 14 | I | Done | Done | 1.5 | 75 | 54 | 158 | 0.30 | 11.9 | 0 |
| | 15 | J | Done | Done | 1.1 | 74 | 64 | 160 | 0.25 | 12.0 | 0 |
| Comparative Example | 16 | A | Done | Done | 0.1 | 50 | 43 | 94 | 0.22 | 11.2 | 303(Test stopped due to adhesion on 500th dotting) |
| | 17 | B | Done | Done | 0.1 | 65 | 44 | 98 | 0.22 | 10.6 | 158 |
| | 18 | C | Done | Done | 0.2 | 62 | 45 | 100 | 0.22 | 10.4 | 102 |
| | 19 | C | Done | Done | 0.2 | 69 | 38 | 94 | 0.25 | 10.9 | 80 |
| | 20 | D | Done | Done | 0.1 | 68 | 53 | 126 | 0.24 | 11.7 | 121 |
| | 21 | D | Done | Done | 0.2 | 63 | 53 | 130 | 0.25 | 10.7 | 20 |
| | 22 | D | Done | Done | 0.2 | 70 | 64 | 178 | 0.26 | 10.2 | 54 |
| | 23 | E | Done | Done | 0.2 | 65 | 62 | 160 | 0.28 | 11.5 | 25 |
| | 24 | E | Done | Not done | 0.2 | 67 | 65 | 189 | 0.30 | 10.8 | 58 |
| | 25 | E | Done | Done | 0.2 | 62 | 58 | 152 | 0.32 | 10.6 | 21 |
| | 26 | F | Done | Done | 0.2 | 65 | 52 | 136 | 0.27 | 11.0 | 56 |
| | 27 | G | Done | Done | 0.1 | 64 | 56 | 142 | 0.25 | 11.0 | 60 |
| | 28 | H | Done | Done | 0.2 | 63 | 52 | 118 | 0.23 | 11.6 | 75 |
| | 29 | I | Done | Done | 0.2 | 67 | 46 | 130 | 0.29 | 11.1 | 80 |
| | 30 | J | Done | Done | 0.2 | 68 | 41 | 128 | 0.31 | 11.2 | 85 |

In Table 2, test Nos. 1 to 15 are examples of the present disclosure, and test Nos. 16 to 30 are examples where rapid cooling after hot rolling and recovering treatment of the amount of Mn in coiling or continuous annealing were not carried out, that is, comparative examples where the content of Mn in a portion from the interface of the steel sheet and the galvanized film to a depth of 5 μm is low and the amount of Al in the galvanized film is excessively small. In test Nos. 1 to 15 that are examples of the present disclosure, the number of times of the occurrence of spark is small in continuous dotting test of spot welding, and, in all of test Nos. 1 to 15, the spot weldability was good. On the other hand, in test Nos. 16 to 30 that are comparative examples, the number of times of the occurrence of spark is so large that, in all of test Nos. 16 to 30, the spot weldability was poor. From the above results, it was found that, when the content of Mn in a portion from the interface of the steel sheet and the galvanized film to a depth of 5 μm is more than or equal to 0.3% and when the content of Al in the galvanized film is larger than 150 g/m², a deterioration in spot weldability of the hot formed galvanized steel sheet can be prevented.

The invention claimed is:
1. A galvanized steel sheet for hot forming, the galvanized steel sheet comprising a galvanized film provided on a surface of a steel sheet,
wherein the steel sheet has a chemical composition consisting of, in mass %,
C: 0.02% to 0.58%,
Mn: 0.5% to 3.0%,
sol. Al: 0.005% to 1.0%,
Ti: 0% to 0.20%,
Nb: 0% to 0.20%,
V: 0% to 1.0%,
W: 0% to 1.0%,
Cr: 0% to 1.0%,
Mo: 0% to 1.0%,
Cu: 0% to 1.0%,
Ni: 0% to 1.0%,
B: 0% to 0.010%,
Mg: 0% to 0.05%,
Ca: 0% to 0.05%,
REM: 0% to 0.05%,
Bi: 0% to 0.05%,
Si: less than or equal to 2.0%,
P: less than or equal to 0.03%,
S: less than or equal to 0.004%,
N: less than or equal to 0.01%, and
the balance: Fe and impurities,
wherein a content of Mn in a portion from an interface of the steel sheet and the galvanized film to a depth of 5 um is more than or equal to 0.3 mass %,
wherein the galvanized film has a plating coverage of 40 g/m² to 110 g/m², an Al content of more than or equal to 150 mg/m² within the galvanized film, and an Al concentration of less than or equal to 0.5 mass %, and wherein a metallographic structure of the steel sheet in the portion from the interface of the steel sheet and the galvanized film to the depth of 5 um has a ferrite area percentage of more than or equal to 60%.

2. The galvanized steel sheet for hot forming according to claim 1, wherein the steel sheet comprises one or more selected from the group consisting of, in mass %,
Ti: 0.01% to 0.20%,
Nb: 0.01% to 0.20%,
V: 0.1% to 1.0%, and
W: 0.1% to 1.0%.

3. The galvanized steel sheet for hot forming according to claim 1, wherein the steel sheet comprises one or more selected from the group consisting of, in mass %,
Cr: 0.1% to 1.0%,
Mo: 0.1% to 1.0%,
Cu: 0.1% to 1.0%,
Ni: 0.1% to 1.0%, and
B: 0.0010% to 0.010%.

4. The galvanized steel sheet for hot forming according to claim 2, wherein the steel sheet comprises one or more selected from the group consisting of, in mass %,
Cr: 0.1% to 1.0%,
Mo: 0.1% to 1.0%,
Cu: 0.1% to 1.0%,
Ni: 0.1% to 1.0%, and
B: 0.0010% to 0.010%.

5. The galvanized steel sheet for hot forming according to claim 1, wherein the steel sheet comprises one or more selected from the group consisting of, in mass %,
Mg: 0.0005% to 0.05%,
Ca: 0.0005% to 0.05%, and
REM: 0.0005% to 0.05%.

6. The galvanized steel sheet for hot forming according to claim 2, wherein the steel sheet comprises one or more selected from the group consisting of, in mass %,
Mg: 0.0005% to 0.05%,
Ca: 0.0005% to 0.05%, and
REM: 0.0005% to 0.05%.

7. The galvanized steel sheet for hot forming according to claim 3, wherein the steel sheet comprises one or more selected from the group consisting of, in mass %,
Mg: 0.0005% to 0.05%,
Ca: 0.0005% to 0.05%, and
REM: 0.0005% to 0.05%.

8. The galvanized steel sheet for hot forming according to claim 4, wherein the steel sheet comprises one or more selected from the group consisting of, in mass %,
Mg: 0.0005% to 0.05%,
Ca: 0.0005% to 0.05%, and
REM: 0.0005% to 0.05%.

9. The galvanized steel sheet for hot forming according to claim 1, wherein the steel sheet comprises, in mass %,
Bi: 0.0002% to less than or equal to 0.05%.

10. The galvanized steel sheet for hot forming according to claim 2, wherein the steel sheet comprises, in mass %,
Bi: 0.0002% to less than or equal to 0.05%.

11. The galvanized steel sheet for hot forming according to claim 3, wherein the steel sheet comprises, in mass %,
Bi: 0.0002% to less than or equal to 0.05%.

12. The galvanized steel sheet for hot forming according to claim 4, wherein the steel sheet comprises, in mass %,
Bi: 0.0002% to less than or equal to 0.05%.

13. The galvanized steel sheet for hot forming according to claim 5, wherein the steel sheet comprises, in mass %,
Bi: 0.0002% to less than or equal to 0.05%.

14. The galvanized steel sheet for hot forming according to claim 6, wherein the steel sheet comprises, in mass %,
Bi: 0.0002% to less than or equal to 0.05%.

15. The galvanized steel sheet for hot forming according to claim 7, wherein the steel sheet comprises, in mass %,
Bi: 0.0002% to less than or equal to 0.05%.

16. The galvanized steel sheet for hot forming according to claim 8, wherein the steel sheet comprises, in mass %,
Bi: 0.0002% to less than or equal to 0.05%.

17. The galvanized steel sheet for hot forming according to claim 1, wherein the galvanized steel sheet is an alloyed hot dip galvanized steel sheet.

18. The galvanized steel sheet for hot forming according to claim 1, wherein the galvanized film is a pure zinc plated film or a zinc alloy plated film.

* * * * *